(12) United States Patent
Karber

(10) Patent No.: US 11,079,039 B2
(45) Date of Patent: Aug. 3, 2021

(54) VALVE STEM EXTENSION

(71) Applicant: Cameron Karber, Paradise Valley, AZ (US)

(72) Inventor: Cameron Karber, Paradise Valley, AZ (US)

(*) Notice: Subject to any disclaimer, the term of this patent is extended or adjusted under 35 U.S.C. 154(b) by 0 days.

(21) Appl. No.: 16/020,708

(22) Filed: Jun. 27, 2018

(65) Prior Publication Data

US 2020/0003327 A1   Jan. 2, 2020

(51) Int. Cl.
*F16K 31/60* (2006.01)
*F16K 5/06* (2006.01)

(52) U.S. Cl.
CPC ............ *F16K 31/60* (2013.01); *F16K 5/0647* (2013.01)

(58) Field of Classification Search
CPC ...... F16K 31/60; F16K 5/0647; F16K 5/0652; F16K 31/445; F16K 31/46; F16K 31/602
USPC ................................. 251/288, 292, 291, 293
See application file for complete search history.

(56) References Cited

U.S. PATENT DOCUMENTS

| | | | | |
|---|---|---|---|---|
| 2,198,455 A * | 4/1940 | Mueller | ................... | F16K 31/44 251/293 |
| 3,583,427 A * | 6/1971 | Taulier | ..................... | F16K 1/02 137/329.01 |
| 4,193,579 A * | 3/1980 | Massey | ................. | F16K 31/602 251/288 |
| 4,756,507 A * | 7/1988 | McAndrew | ............. | F16K 31/46 251/288 |
| 5,579,804 A * | 12/1996 | Roberts | ................... | F16K 35/06 137/385 |
| 6,257,551 B1 * | 7/2001 | Veiga | ...................... | F16K 31/46 251/288 |
| 2006/0151180 A1 * | 7/2006 | Gallina | ................... | F16K 31/60 166/380 |
| 2008/0149873 A1 * | 6/2008 | Cimberio | .............. | F16K 5/0647 251/149.6 |
| 2010/0294968 A1 * | 11/2010 | Teague, Jr. | ............ | F16K 5/0652 251/304 |

\* cited by examiner

*Primary Examiner* — Kelsey E Cary

(74) *Attorney, Agent, or Firm* — Buchalter, a Professional Corp.; Kari Barnes

(57) ABSTRACT

Systems and methods for extending a valve stem. The systems include an extender, a securing apparatus, a cover, and a handle. The extender is placed on and around the valve stem and the cover over and around the extender. The handle is secured to an upper surface of the extender by the securing apparatus. The methods include configuring the extension onto a valve stem by removing a securing apparatus and a handle and affixing the extender and cover to a lower surface of a valve. The securing apparatus secures the handle to an upper surface of the extender.

14 Claims, 6 Drawing Sheets

VALVE STEM EXTENSION

BACKGROUND

Ball valves are items that are often used to control the flow of fluids and gasses. A ball valve uses a hollow, perforated, pivoting ball to control the flow of fluid and/or gas through the valve body. The position of the ball is controlled by a valve handle which is connected to a valve stem. Often times, valves are insulated to reduce heat transfer and/or condensation around the valve body. Because the insulation may interfere with the operation of the valve handle, it may be desirable to extend the valve stem in order for the valve handle to be accessible and operable while remaining vapor-sealed.

A ball valve often has a valve stem with a threaded male assembly that protrudes from the valve body. The valve handle has an opening that accepts the male assembly and is generally secured to the assembly with a fastener.

However, present devices that may increase the distance from the valve handle to the valve body are ineffective. The present devices allow damage to the valve due to condensation. Due to air ingress, condensation forms on the surface of the valve and as the condensation collects, it seeps between the piping insulation and the pipes, which rusts steel pipes, increases heat loss/gain, damages the insulation system, promotes mold growth, and/or damages architectural finishes.

Furthermore, present devices often times do not use the same valve handle, but a valve handle made specifically for the extension. Because the extension handle may not share the same characteristics as the original handle, additional costs for the extension may be incurred.

SUMMARY

Aspects of the present disclosure comprise devices and methods for extending a valve stem. Other aspects of the present disclosure may comprise extending the valve stem that is attached to the stem of a ball valve such that a handle of the valve stem may be accessible and operable.

A ball valve in accordance with an aspect of the present disclosure may include a valve body, a securing apparatus, an extender, a cover, and a handle. The securing apparatus may secure the handle to an upper surface of the extender. The cover may cover an outer portion of the extender, such that the cover extends along a length of the extender. The securing apparatus may secure the extender to an upper surface of the valve body. The securing apparatus may be placed on an upper surface of the handle.

In another aspect of the present disclosure, a method for extending a valve stem may include removal of a handle and securing apparatus from a valve, thus exposing the valve stem. The extender may be placed over the valve stem. The cover may be placed over and around the extender and the handle may be placed on an upper surface of the extender. The securing apparatus may secure the handle to the upper surface of the extender.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further purposes and advantages, will be better understood from the following description when considered in connection with the accompanying figures. It is to be expressly understood, however, that each of the figures is provided for the purposes of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

Figure 1:
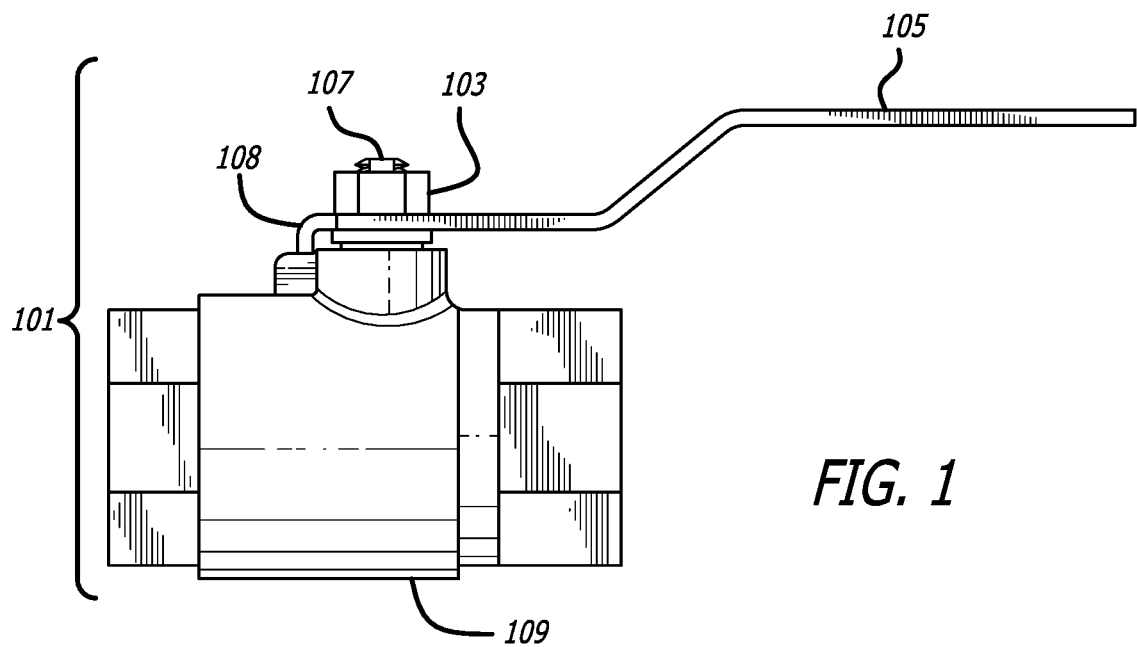
FIG. 1 illustrates a side elevation view of a ball valve in accordance with an aspect of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

The following detailed description illustrates by way of example, not by way of limitation, the principles of the disclosure. The present disclosure will enable one reasonably skilled in the art to make and use the disclosed aspects and/or embodiments, and describes several embodiments, adaptations, variations, alternatives and uses of the disclosure, including what is presently believed to be the best mode of embodying the disclosure. It should be understood that the drawings are diagrammatic and schematic representations of exemplary aspects and/or embodiments of the disclosure and are not limiting of the present disclosure, nor are the drawings necessarily drawn to scale. Embodiments of the disclosure are described herein with reference to cross-sectional view illustrations that are schematic illustrations of embodiments of the disclosure. As such, the actual dimensions of elements can be different, and variations from the shapes of the illustrations as a result, for example, of manufacturing techniques and/or tolerances are expected. Embodiments of the disclosure should not be construed as limited to the particular shapes of the regions illustrated herein but are to include deviations in shapes that result, for example, from manufacturing. A region illustrated or described as square or rectangular may have slightly rounded or curved features due to normal manufacturing tolerances. Thus, the regions illustrated in the figures are schematic in nature and their shapes are not intended to illustrate the precise shape of a region of a device and are not intended to limit the scope of the disclosure. It is understood that the shapes, sizes, and locations in the attached figures may not be to scale.

Although aspects of the present disclosure may be described and illustrated herein in terms of a device and method for extending a valve stem of a ball valve, it should be understood that the disclosed aspects, and any embodiments of the present disclosure are not so limited, but are additionally applicable to other uses and purposes, such as extending a valve stem of other types of valves and/or other devices.

Aspects of the present disclosure may permit a way of producing and using a ball valve with a handle that is extended beyond an original placement. Some aspects may include a middle portion connecting continuous lengths on opposing sides of the connecting portion. Some aspects may include a connecting portion positioned approximately half way along the length of the opposing sides.

Aspects of the present disclosure may include a valve body, a securing apparatus, an extender, a cover, and a handle. The securing apparatus may secure the handle to an upper surface of the extender. The cover may cover an outer portion of the extender, such that the cover extends along a length of the extender. The securing apparatus may secure the extender to an upper surface of the valve body. The securing apparatus may be placed on an upper surface of the handle.

The valve body may further include a valve stem that is located on an upper surface of the valve body. The extender may interact with the valve stem such that the extender may be substantially over and around the valve stem. The extender may matably interact with the valve stem. A non-limiting example is the valve stem and extender may be threaded such that the extender may be screwed onto the valve stem.

An aspect of the present disclosure may further include a primary fastener. The primary fastener may be placed on an upper surface of the valve body, such that a lower surface of the primary fastener contacts the upper surface of the valve body and an upper surface of the primary fastener contacts a lower surface of the cylinder. The primary fastener may further comprise an opening that accepts the valve stem. The primary fastener may further include an extension such as, but not limited to, a tab. The extension may contact the upper surface of the valve body. Movement of the extension may be translated to movement of the handle, such that the extension may move when the handle is moved, and vice versa. The extension may abut a raised portion of the upper surface of the valve body. Movement of the extension may be impeded when the extension comes into contact with the raised portion. As such, movement of the handle may also be impeded when the extension comes into contact with the raised portion.

An aspect of the present disclosure may include a secondary fastener. The secondary fastener may couple with a portion of the extender. The secondary fastener may secure the extender to the valve stem.

The securing apparatus may matably interact with the extender.

The securing apparatus may include a means for coupling such as, but not limited to, a fastener, an adhesive, or any combination thereof.

The primary fastener may be a fastener such as, but not limited to, a washer, a nut, a gasket, a bolt, a screw, strap, or any combination thereof. The secondary fastener may be a fastener such as, but not limited to a washer, a nut, a gasket, a bolt, a screw, strap, or any combination thereof. The primary fastener and the secondary fastener may be the same type of fastener. The primary fastener and the secondary fastener may be different types of fastener.

The extender may be made of a material such as, but not limited to, brass, carbon steel, stainless steel, or any combination thereof.

The cover may be made of a material such as, but not limited to, nylon, plastic, thermoplastic, or other materials, and/or any combination thereof.

An aspect of the present disclosure includes a method that may include removal of a handle and securing apparatus from a valve, thus exposing the valve stem. The extender may be placed over the valve stem. The cover may be placed over and around the extender and the handle may be placed on an upper surface of the extender. The securing apparatus may secure the handle to the upper surface of the extender.

FIG. 1 is a side elevation view of a ball valve. The ball valve 101 may include a securing apparatus, hereinafter referred to as a fastener 103, a handle 105, a valve stem 107, and a valve body 109. The handle 105 may further include a tab 108 that may contact the valve body 109. The tab 108 may prevent the handle 105 from rotating beyond an intended range by contacting an upper surface of the valve body 109 and impeding further movement of the handle 105. The fastener 103, handle 105, valve stem 107, and valve body 109 may be made from various materials, e.g., steel, brass, allowed metals, iron, etc., as well as polymers and/or other plastic materials and/or other materials, and may be made from different materials than other parts of the ball valve 101 without departing from the scope of the present disclosure.

Figure 2:
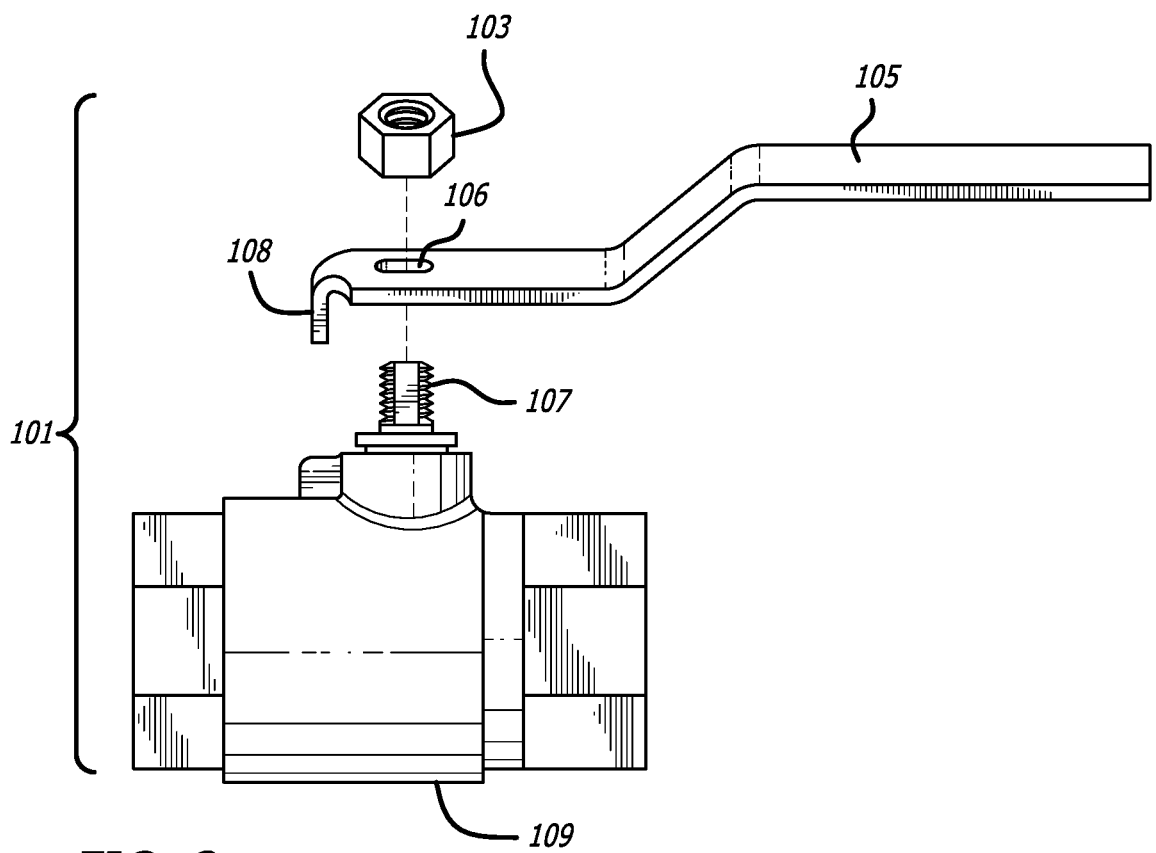
FIG. 2 illustrates an exploded side elevation view of a ball valve in accordance with an aspect of the present disclosure.

FIG. 2 is an exploded side elevation view of a ball valve. Specifically, FIG. 2 depicts the ball valve 101 with the fastener 103, the handle 105, and the valve stem 107 removed. As shown in FIG. 2, the handle 105 may further include an opening 106 that mates the handle 105 with the valve stem 107.

As shown in FIG. 2, the valve stem 107 may extend from an upper surface of the valve body 109. The opening 106 of the handle 105 may align with the valve stem 107. The handle 105 may be placed over the valve stem 107, such that the opening 106 may accept the valve stem 107. The fastener 103 may be placed on top of the handle 105 and around the valve stem 107. The fastener 103 may secure the handle 105 to the valve stem 107.

In an aspect of the present disclosure, the valve stem 107 may be threaded. An inside surface of the fastener 103 may also be threaded. The valve stem 107 and the fastener 103 may matably interact such that the fastener 103 may be threaded onto the valve stem 107.

Figure 3:
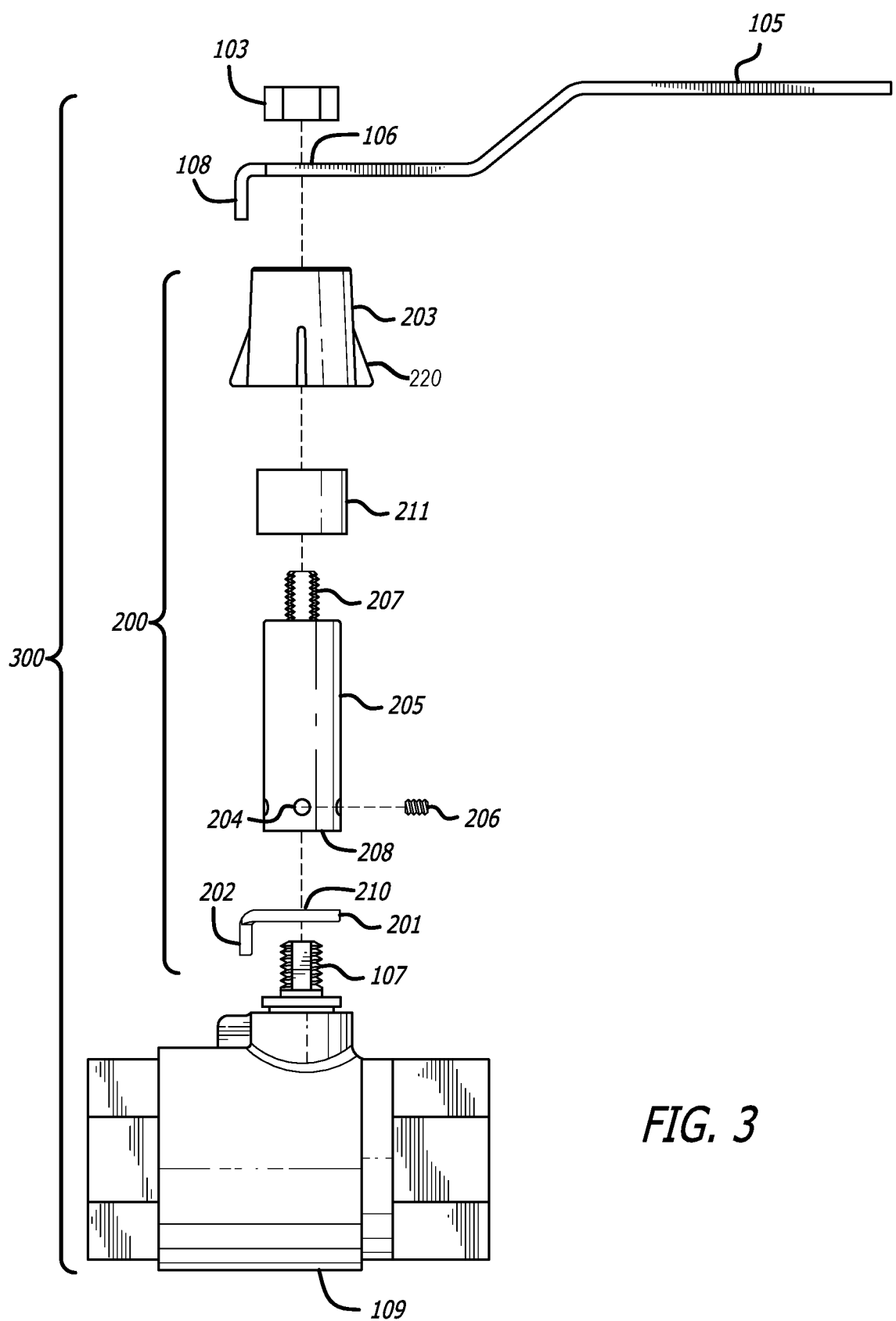
FIG. 3 illustrates an exploded view of a valve stem extension on a ball valve in accordance with an aspect of the present disclosure.

FIG. 3 is an exploded view of a valve stem extension on a ball valve according to embodiments described herein. The valve stem extension 200 may include a primary fastener 201, hereinafter referred to as a washer 201, a cover 203, an extender 205, hereinafter referred to as a cylinder 205, a set screw 206, and a compression gasket 211.

The cylinder 205 may further include a set screw opening 204 that may accept the set screw 206. The cylinder 205 may include an inner opening 208 that may accept the valve stem 107. The cylinder 205 may also include an extension 207 that may be located distal to the inner opening 208.

The washer 201 may further include a tab 202 and an opening 210. The opening 210 may be placed over the valve stem 107 such that the washer 201 may be around a circumference of the valve stem 107. The cylinder 205 may be placed on top of the valve stem 107 such that the inner opening 208 is around a circumference of the valve stem 107. A lower surface of the cylinder 205 may contact the washer 201. The cylinder 205 may be secured to the valve stem 107 by the set screw 206, which may matably interact with the set screw opening 204. The extension 207 may be distal to the valve body 109. Set screw 206 may engage with a portion of valve stem 107 that is flattened and/or otherwise designed to accept engagement of set screw 206, such that tab 108 on handle 105 may be approximately aligned with and/or offset by a particular desired amount from tab 202. For example, and not by way of limitation, handle 105 is often approximately parallel (in the direction of) the flow through valve body 109 when valve 101 is "open" (i.e., allowing fluid and/or gas flow through valve 101) and handle 105 is often approximately perpendicular to (or normal to) valve body 109 when valve 101 is "closed" (i.e., not allowing fluid and/or gas flow through valve 101). Tab 108, and any limitations on the movement of tab 108, may be placed to limit the rotation of valve stem 107 to an open and/or closed position on the valve 101. When extension 200 is coupled to valve body 109, it may be desirable to align, or offset, the position of handle 105 vis-à-vis the relative alignment of tab 108 and tab 202. This may occur by only providing screw opening 204 in certain locations on extension 205, e.g., such that any mating surface on valve stem 107 is aligned with and/or offset from a corresponding surface on extension 207.

The compression gasket 211 may be placed over the cylinder 205, such that the compression gasket 211 is around a circumference of the cylinder 205. The cover 203 may be placed over the compression gasket 211, such that the cover 203 is around a circumference of the compression gasket 211. The extension 207 may remain uncovered by the compression gasket 211 and the cover 203.

Compression gasket 211 may provide insulation to the valve stem 107 and allow for extension 205 to extend away from the valve stem 107 by a given distance, i.e., the length of extension 205. The length of extension 205 may be varied depending on the amount of interference that insulation, connected piping, and/or other obstacles that may impede the operation of handle 105 in opening and/or closing valve 300. Further, cover 203 maintains a substantially airtight seal between compression gasket 211 and extension 205, such that changes in temperature between valve stem 107 which may have heated or cooled fluids passing through valve 300 and the ambient temperature that handle 105 is exposed to. This increase in the insulation available near valve 300 may allow for reduced condensation on or proximate valve 300, which may improve performance and/or maintenance characteristics associated with valve 300.

The opening 106 of the handle 105 may align with the extension 207. The handle 105 may be placed over the extension 207, such that the opening 106 may accept the extension 207. The fastener 103 may be placed on top of the handle 105 and around the extension 207. The fastener 103 may secure the handle 105 to the extension 207.

The extension 207 may be threaded. An inside surface of the fastener 103 may also be threaded. The extension 207 and the fastener 103 may matably interact such that the fastener 103 may be screwed onto the extension 207.

The cylinder 205 may have a plurality of secondary fastener openings 204, hereinafter referred to as set screw openings 204 and a plurality of secondary fasteners, hereinafter referred to as set screws, 206 such that each of the set screw openings 204 may accept one or more of the set screws 206.

The cover 203 may encompass one or more extensions 205. The one or more extensions 205 may further insulate the valve stem extension 200.

Figure 3A:
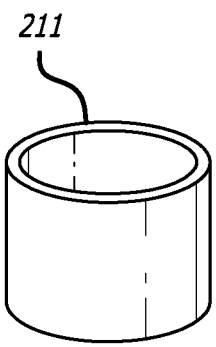
FIG. 3A illustrates a compression gasket in accordance with an aspect of the present disclosure.

FIG. 3A depicts a compression gasket according to an aspect of the present disclosure. As shown, the compression gasket 211 may have an inner circumference and an outer circumference.

Figure 3B:
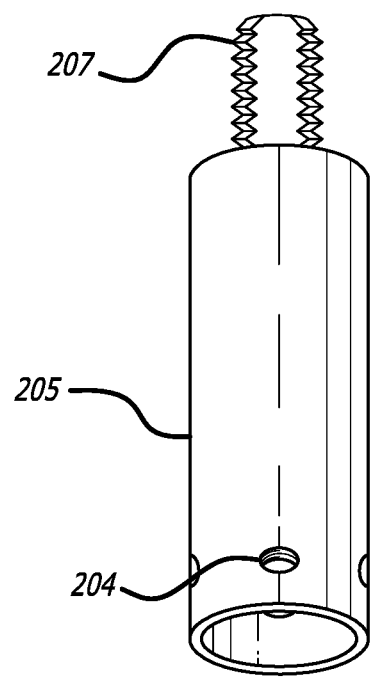
FIG. 3B illustrates an extender cylinder in accordance with an aspect of the present disclosure.

FIG. 3B depicts a cylinder according to embodiments described herein. As shown, the cylinder 205 may include a plurality of set screw openings 204. The cylinder 205 may also include an extension 207. The extension 207 may be distal to the set screw openings 204.

Figure 3C:
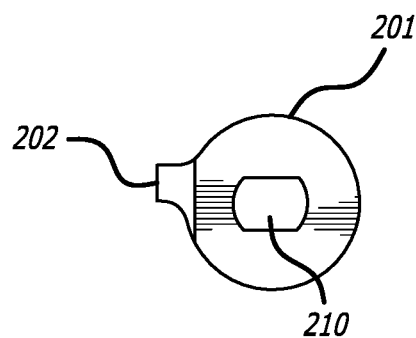
FIG. 3C illustrates a primary fastener in accordance with an aspect of the present disclosure.

FIG. 3C depicts a washer according to embodiments described herein. As shown, the washer 201 may further include a tab 202 and an opening 210.

Figure 4:
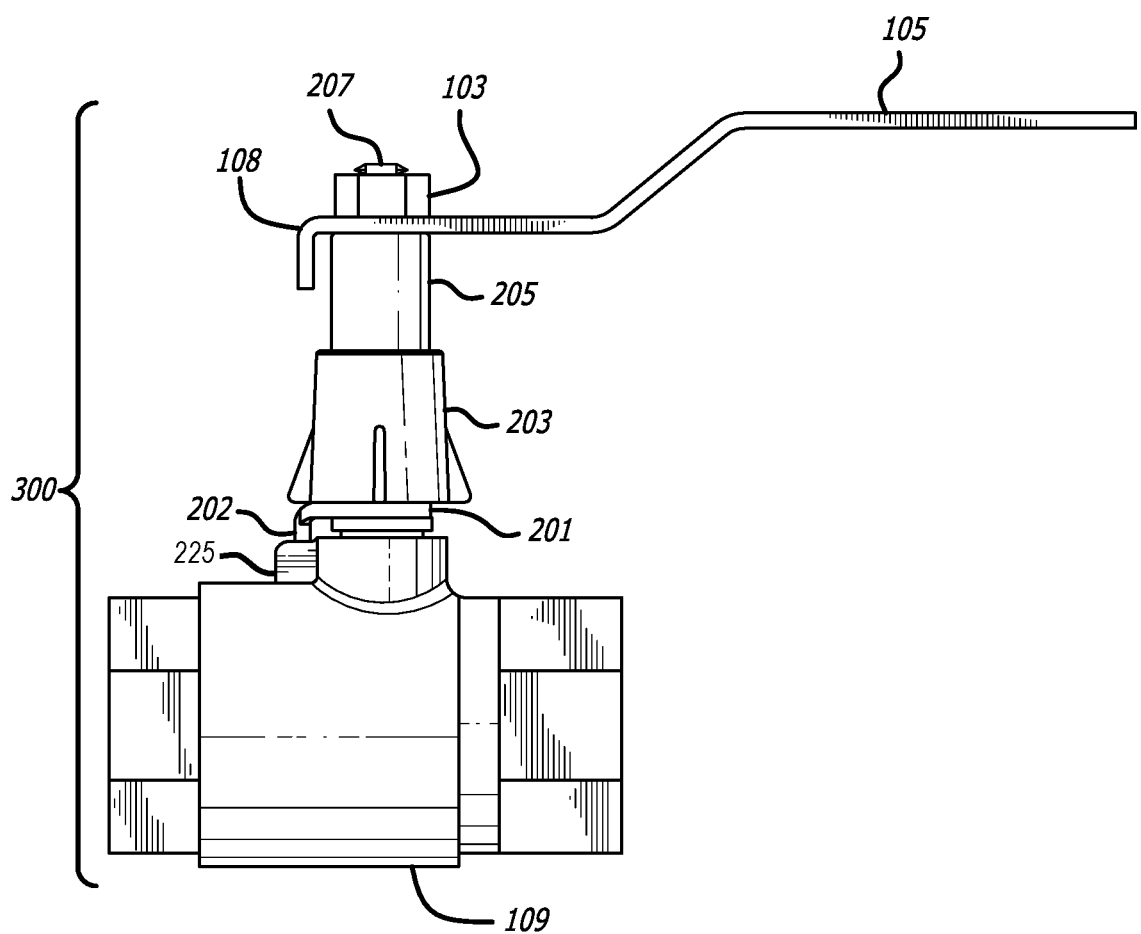
FIG. 4 illustrates a view of the valve stem extension in use on a ball valve in accordance with an aspect of the present disclosure.

FIG. 4 is a view of the valve stem extension in use on a ball valve according to embodiments described herein. As shown in FIG. 4, the assembled ball valve with valve extension 300 may include a fastener 103, a handle 105, a handle tab 108, a cover 203, a cylinder 205, a male 207, a washer 201, and a valve body 109. The washer 201 may further include a tab 202.

The male extension 207 may extend upwards, distal to the valve body 109. The washer 201 may be substantially above an upper surface of the valve body 109, such that the washer 201 is substantially in between the valve body 109 and the cylinder 205. The cover 203 may cover the cylinder 205. A lower surface of the cover 203 and a lower surface of the cylinder 205 may contact upper surface of the washer 201. The handle 105 may be placed over the extension 207 such that the handle 105 contacts an upper surface of the cylinder 205. The fastener 103 may include an opening that may be threaded. The fastener 103 may matably interact with the extension 207. The fastener 103 may secure the handle 105, the cylinder 205, the cover 203, and the washer 201 in place.

The tab 202 of the washer 201 may contact the upper surface of the valve body 109. The tab 202 may prevent the handle 105 from turning past an intended range by contacting the upper surface of the valve body and impeding further movement of the handle 105.

As shown in FIG. 4, the valve stem is extended upwards, as the cylinder 205 is located in between the valve body 109 and the handle 105. Thus the handle 105 is located substantially farther from the valve body 109 than in FIG. 1, where the handle 105 is in direct contact with the valve body 109.

Figure 5:
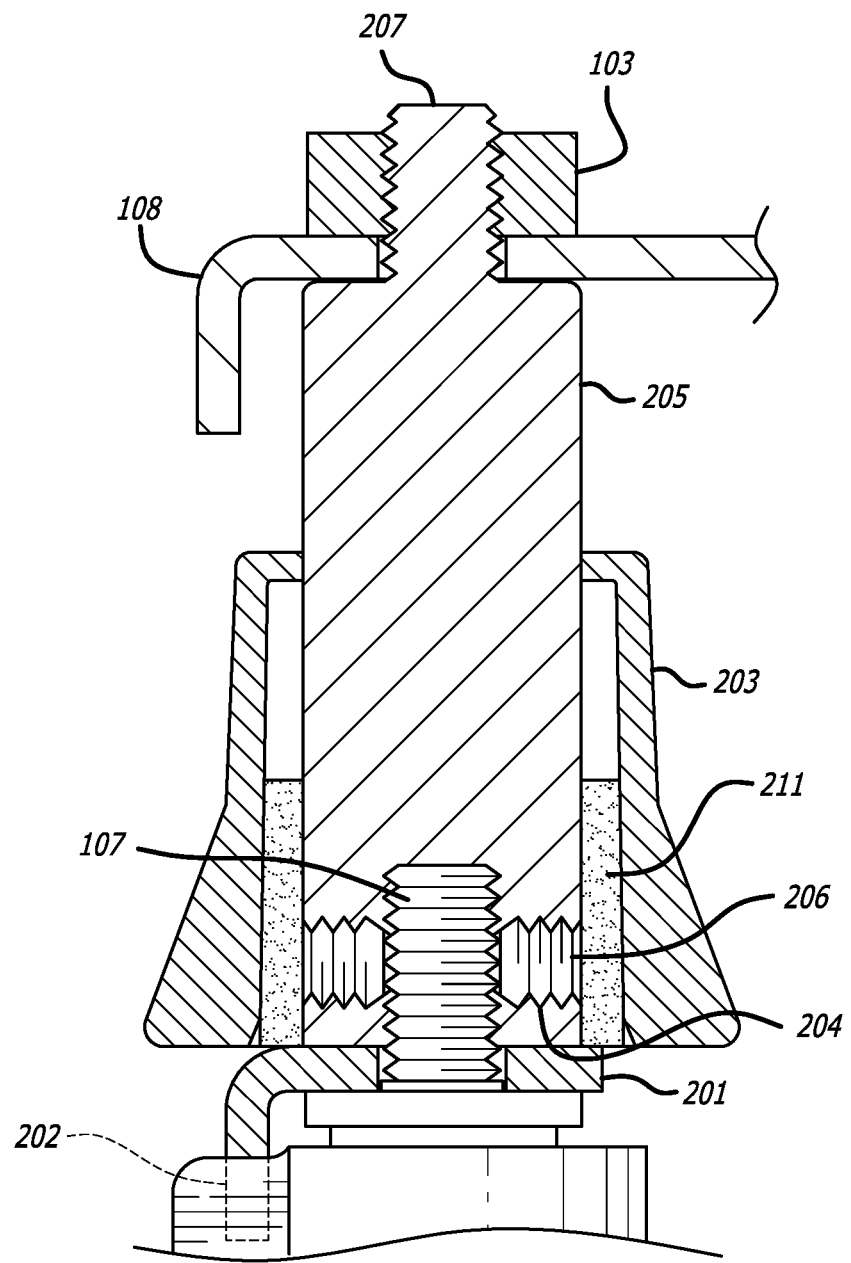
FIG. 5 illustrates a cross-section view of the valve stem extension in use on a ball valve in accordance with an aspect of the present disclosure.

FIG. 5 is a cross-section view of the valve stem extension in use on a ball valve according to embodiments described herein. FIG. 5 depicts the configuration of the ball valve once the valve stem extension is in place.

As shown in FIG. 5, the extension 207 may extend from an upper surface of the cylinder 205. The extension 207 may be threaded. The handle may have an opening that is configured to accept the extension 207. The fastener 103 may also have an opening that is configured to accept the extension 207.

The compression gasket 211 may fit over a circumference of the cylinder 205. The cover 203 may cover the cylinder 205 and the compression gasket 211. The cover 203 may have a circumference that is greater than a circumference of the cylinder 205.

The compression gasket 211 may increase a circumference of the cylinder 205 such that the cover 203 may fit around a circumference of the cylinder 205.

The fastener 103 may secure the handle to the extension 207. The cylinder 205 may be secured to the valve stem 107 by one or more set screws 206. The set screws may be threaded. The set screws 206 may contact the valve stem 107 in order to secure the cylinder 205 to the valve stem 107.

As shown in FIG. 5, the tab 202 on the washer 201 may contact an upper surface of the valve body 109. The upper surface may further include a raised portion, hereinafter referred to as a stopper, 225. The stopper 225 may overlap a portion of the tab 202 such that a movement of the tab 202 may be impeded when the tab 202 comes into contact with the stopper 225. The tab 202 may move when the handle is moved. As such, the stopper 225 and the tab 202 may prevent the movement of the handle past an intended range.

Figure 6:
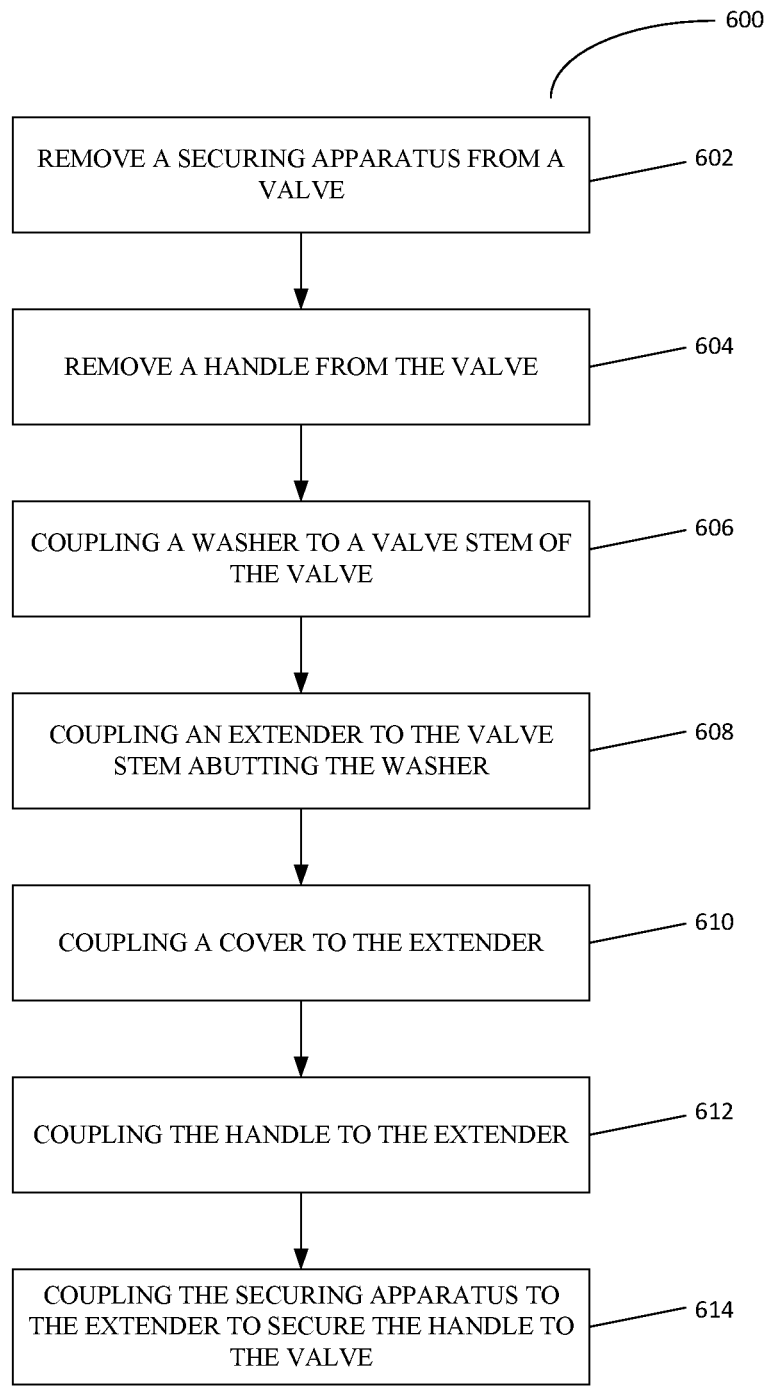
FIG. 6 illustrates a flow diagram indicating method steps in accordance with an aspect of the present disclosure.

FIG. 6 illustrates a flow diagram indicating method steps in accordance with an aspect of the present disclosure.

Diagram 600 illustrates block 602, which illustrates and/or represents removing a securing apparatus from a valve. Block 604 illustrates and/or represents removing a handle from the valve. Block 606 illustrates and/or represents coupling a washer to a valve stem of the valve. Block 608 illustrates and/or represents coupling an extender to the valve stem abutting the washer. Block 610 illustrates and/or represents coupling a cover to the extender. Block 612 illustrates and/or represents coupling the handle to the extender, and block 614 illustrates and/or represents coupling the securing apparatus to the extender to secure the handle to the valve.

The present disclosure is described herein with reference to certain embodiments, but it is understood that the disclosure can be embodied in many different forms and should not be construed as limited to the embodiments set forth herein. In particular, the present disclosure is described below in regards to certain modules having features in different configurations, but it is understood that the present disclosure can be used for many other modules and/or configurations. The modules and systems can also have many different shapes beyond those described below.

All physical dimensions, weights, temperatures, etc. in the description and attached drawings are exemplary in nature. It is understood that embodiments of the present disclosure can have various dimensions/weights/temperatures/etc. varying from those shown in the attached drawings.

Although the present disclosure and its advantages have been described in detail, it should be understood that various changes, substitutions and alterations can be made herein without departing from the technology of the disclosure as defined by the appended claims. It should also be understood that when a feature or element may be referred to as being "on" another element, it can be directly on the other element or intervening elements may also be present unless specifically stated otherwise. Furthermore, relative terms such as "inner", "outer", "upper", "above", "lower", "beneath", and "below", and similar terms, may be used herein to describe a relationship of one element or attribute to another. With regard to the figures, it is to be understood that these terms are intended to encompass different orientations of the device in addition to the orientation depicted.

Moreover, the scope of the present application is not intended to be limited to the particular configurations of the process, machine, manufacture, composition of matter, means, methods, and/or steps described in the specification. As one of ordinary skill in the art will readily appreciate from the disclosure, processes, machines, manufacture, compositions of matter, means, methods, and/or steps, presently existing or later to be developed, that perform substantially the same function or achieve substantially the same result as the corresponding configurations described herein may be utilized according to the present disclosure. Accordingly, the appended claims are intended to include within their scope such processes, machines, manufacture, compositions of matter, means, methods, and/or steps.

Although the terms first, second, etc. may be used herein to describe various elements, components, regions, and/or sections, these elements, components, regions, and/or sections should not be limited by these terms. These terms are only used to distinguish one element, component, region, or section from another element, component, region, or section. Thus, a first module, element, component, region, or section discussed below could be termed a second module, element, component, region, or section without departing from the teachings of the present disclosure.

The description of the disclosure is provided to enable any person reasonably skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and/or designs described herein, but is to be accorded the widest scope consistent with the principles and novel features disclosed herein.

What is claimed is:

1. A system for extending a valve stem comprising:
an extender;
a cover that covers an outer surf ace of the extender;
a handle that is placed on an upper surface of the extender;
a washer with a tab;
a compression gasket that is affixed to an outer circumference of the extender and inner circumference of the cover, such that the compression gasket is radially in between and in contact on opposing inner and outer sides of the compression gasket with the extender and the cover, wherein the compression gasket is a complete cylindrical tube positioned from a terminal end of the extender over a longitudinal length of the extender such that the compression gasket is configured to be fully circumferentially around the valve stem for the entire longitudinal length when the valve stem extension is positioned on the valve stem and provide insulation to the valve stem; and
a securing apparatus that secures the extender and handle to a valve body.

2. The system of claim 1, wherein the extender further comprises a first opening that accepts the valve stem.

3. The system of claim 2, wherein the system further comprises a fastener;
wherein the extender further comprises a second opening that matably interacts with the fastener such that the fastener secures the extender to the valve stem.

4. The system of claim 3, wherein the washer is placed in between the valve body and the extender and the tab contacts the valve body.

5. The system of claim 1, wherein an interior surface of the extender is threaded and matably interacts with the valve stem.

6. The system of claim 1, wherein the securing apparatus is a bolt, a nut, a washer, or a coupling.

7. The system of claim 1, wherein the handle further comprises an opening.

8. The system of claim 1, wherein the extender is comprised of brass, steel, carbon steel, stainless steel, or metal.

9. The system of claim 1, wherein the cover is comprised of nylon.

10. A method of extending a valve stem of a valve, comprising:
    removing a securing apparatus from a valve;
    removing a handle from the valve;
    coupling a washer with a tab directly onto a valve stem of the valve;
    coupling an extender to the valve stem abutting the washer;
    coupling a cover to the extender;
    coupling a compression gasket to an outer circumference of the extender and inner circumference of the cover, such that the compression gasket is radially in between and in contact on opposing inner and outer sides of the compression gasket with the extender and the cover;
    coupling the handle to the extender, wherein the compression gasket is a complete cylindrical tube positioned from a terminal end of the extender over a longitudinal length of the extender such that the compression gasket is configured to be fully circumferentially around the valve stem for the entire longitudinal length when the valve stem extension is positioned on the valve stem and provide insulation to the valve stem; and
    coupling the securing apparatus to the extender to secure the handle to the valve.

11. The method of extending a valve stem of claim 10, further comprising placing the handle on an upper surface of the extender to secure the extender to the valve by the securing apparatus.

12. The method of extending a valve stem of claim 11, further comprising fastening the extender to the valve stem with a fastener.

13. The method of extending a valve stem of claim 11, further comprising fastening the extender to the valve stem with a fastener.

14. The method of extending a valve stem of claim 11, wherein the compression gasket is placed over and around the extender, such that the compression gasket is in between the extender and the cover.

* * * * *